United States Patent Office 3,303,507
Patented Feb. 7, 1967

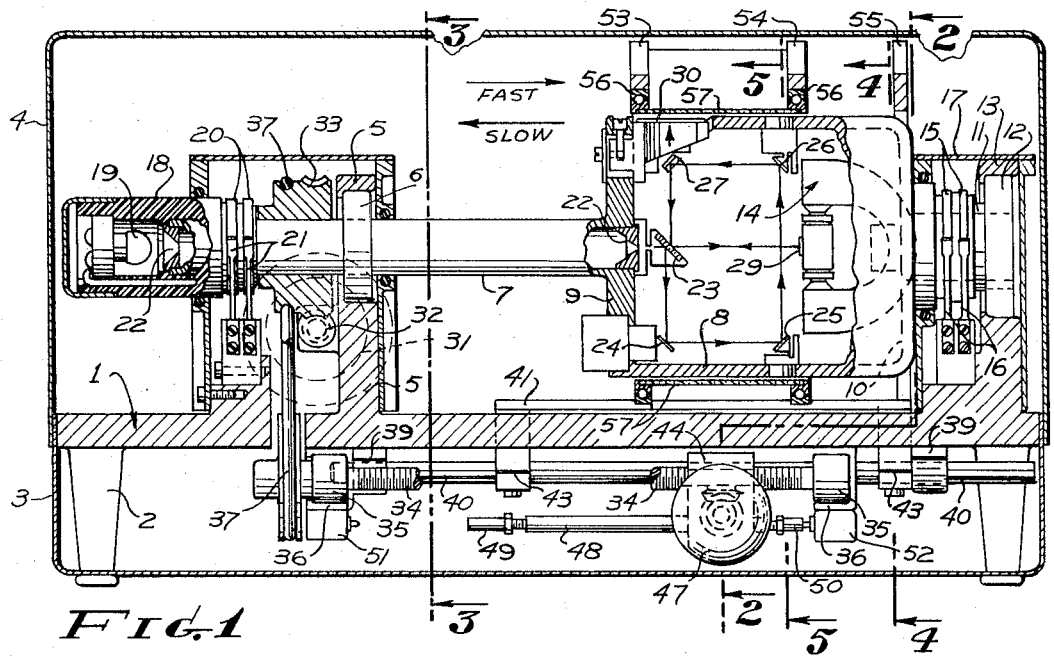

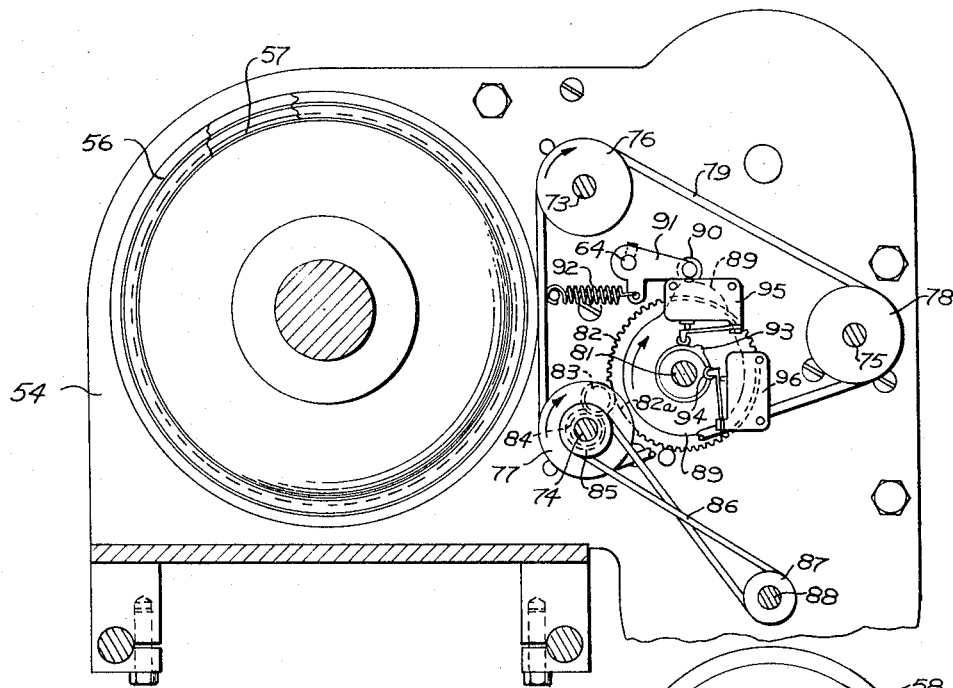

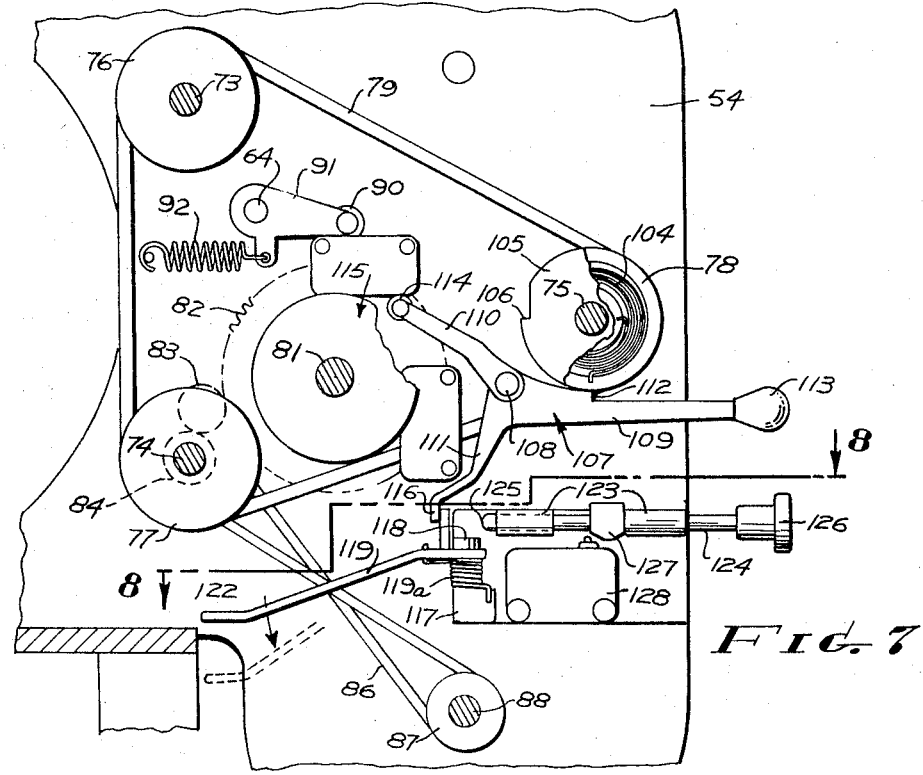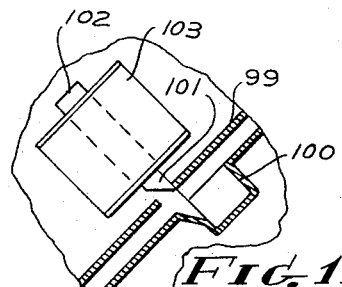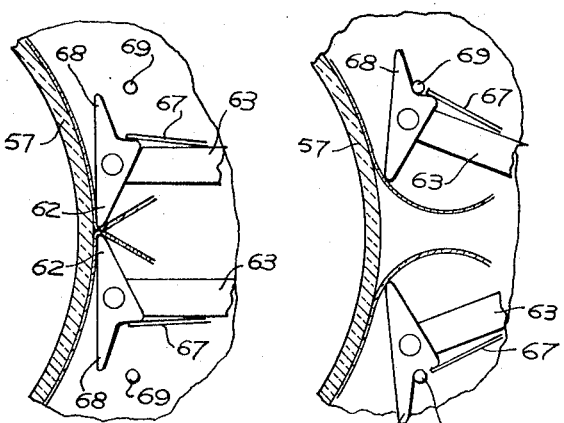

3,303,507
LONG TERM PHOTOGRAPHIC RECORDER
Francis E. Lehner, Monrovia, and Witold Krynicki, Pasadena, Calif., assignors to California Institute Research Foundation, Pasadena, Calif., a corporation of California
Filed Oct. 1, 1964, Ser. No. 400,756
10 Claims. (Cl. 346—24)

This invention relates to long term photographic recorder.

Included in the objects of this invention are:

First, to provide a long term photographic recorder which is particularly adapted for the recording of output signals from a seismometer over a long period of time, for example, several weeks or several months, if desired, and which may be left unattended for its recording period, thereby providing an instrument which may be installed in remote locations or places which are not conveniently accessible.

Second, to provide a long term photographic recorder which, although primarily adapted for seismographic use, may be arranged to record any information which may be supplied to a suspended mirror galvanometer or analogous instrument.

Third, to provide a long term photographic recorder wherein the image from the mirror of a slowly rotating galvanometer is described in a helical path onto a cylindrical unit of a recording film, which, when the record therein is compiled is automatically and quickly advanced to expose a second unit of film, and wherein a large magazine comprising many units of film may be stored so as to provide an exceptionally long recording period.

Fourth, to provide a long term photographic recorder wherein the camera may be quickly cleared of recorded film so as to minimize the loss of recording time and wherein the clearing operation may be done at any time it may be convenient to the operator irrespective of the period established for normal servicing of the camera.

With the above and other objects in view as may appear hereinafter, reference is directed to the accompanying drawings in which:

FIGURE 1 is a partial sectional partial side view of the long term photographic recorder.

FIGURE 2 is a transverse sectional view thereof taken substantially through 2—2 of FIGURE 1, with the photographic recording mechanism shown in end elevation.

FIGURE 3 is a fragmentary tranverse sectional view taken through 3—3 of FIGURE 1.

FIGURE 4 is an enlarged fragmentary sectional view taken through 4—4 of FIGURE 1 showing the photographic recording mechanism including a transparent cylindrical drum or sleeve but omitting the structure within the drum.

FIGURE 5 is a similarly enlarged fragmentary sectional view taken substantially through 5—5 of FIGURE 1.

FIGURE 6 is a fragmentary sectional view showing a modified form of the transparent drum and a modified means of supporting the photographic film thereon.

FIGURE 7 is a fragmentary sectional view similar to FIGURE 4 but further enlarged and illustrating mechanism whereby the exposed film may be severed from the film supply at any time during the course of operation of the long term photographic recorder.

FIGURE 8 is a fragmentary sectional view taken substantially through 8—8 of FIGURE 7.

FIGURE 9 is an enlarged fragmentary sectional view taken within circle 9 of FIGURE 5 and showing the clamping means employed to secure a section of the photographic film in position about the transparent drum.

FIGURE 10 is a similar fragmentary sectional view showing the clamping means in its open condition.

FIGURE 11 is a fragmentary sectional view of the film guide taken within circle 11 of FIGURE 5 to which has been added a film cutting means.

The long term photographic recorder includes a rigid bed structure 1, having supporting feet 2. The bed structure is encased within a lower shell 3 and upper shell 4. The bed structure is provided with a pedestal 5 which carries a bearing 6 for supporting a tubular shaft 7 in a horizontal position. The tubular shaft is joined to a concentric cylindrical housing 8 by the means of an end wall 9 at one axial extremity of the housing. The remaining end of the housing 8 is closed by an end wall 10 which is joined to a stub shaft 11 coaxial with the tubular shaft 7. The stub shaft 11 is supported in a bearing 12 carried by a second pedestal or post 13 extending upwardly from the bed structure 1.

Suitably supported within the cylindrical housing 8 adjacent its end wall 10 is a reflection galvanometer 14 of the suspended or deflected mirror type. The stub shaft 11 is provided with slip rings 15 engaged by contact fingers 16 for transmitting signals to the galvanometer from a sensing device or signal source, for example, a seismometer not shown. These slip rings and contact fingers may be covered by an enclosure 17 in addition to the cover afforded by the shells 3 and 4.

At the end of the tubular shaft 7 opposite from the cylindrical housing 8 is a sleeve 18 containing a light source 19 for directing a beam of light along the axis of the tubular shaft. Current is supplied to the light source through slip rings 20 and contact fingers 21.

Light from the source 19 is confined to a beam of small diameter by means of focusing apertures 22 or other conventional means. The beam on entering the cylindrical housing 8 is reflected by one side of a double surfaced mirror 23 in a radial direction and then is reflected around the sides of a rectangle by means of mirrors 24, 25, 26 and 27 located at the corners of the rectangle.

The mirrors 24, 25 and 26 may be in a common plane whereas the mirror 27 is offset from the common plane but so arranged that the beam of light received from the mirror 26 is directed to the remaining side of the double surfaced mirror 23. The beam reflected from the second side of the mirror 23 strikes the suspended mirror 29 of the galvanometer and is reflected back to the mirror 23 in a path offset from the path of the beam between mirror 27 and the mirror 23. The final path of the beam is radial and passes through a cylindrical lens 30.

After passing through the cylindrical lens the beam encounters a photographic film forming part of a photographic recording mechanism to be described hereinafter.

Supported at one side of the pedestal 5 is a drive motor 31 provided with a drive worm 32 which engages a worm gear 33 mounted on the tubular shaft 7. Mounted below the bed structure 1 along an axis parallel to the tubular shaft 7 is a screw shaft 34 supported by bearings 35 secured in brackets 36 depending from the bed structure. The tubular shaft 7 and the screw shaft 34 are interconnected by a belt and pulley drive 37. An enclosure 38 may surround the tubular shaft 7 adjacent the light source.

The bed structure is provided with two pair of slide bearings 39 defining axes parallel to the tubular shaft 7 and the screw shaft 34. The slide bearings 39 receive a pair of guide rod 40. Disposed immediately above the bed structure 1 is a camera carriage plate 41 having depending bosses 42 extending through slots in the bed structure and joined to the guide rods 40 by means of clamp elements 43.

Secured to the guide rods by clamp elements 44a and extending therebetween is a frame 44 through which extends the screw shaft 34. The screw shaft is provided with screw threads which are engaged by a worm gear 45 carried by the frame 44. The worm gear is connected by means of beveled gears 46 to a motor 47 which, when operated, effects rapid traverse of the carriage plate 41.

Mounted on the frame 44 is a stop rod 48 having adjustable stops 49 and 50 at its extremities. The adjustable stops are adapted to engage limit or stop switches 51 and 52. The switches are so connected electrically as to stop movement of the carriage plate 41 and cause the plate to reverse its direction of movement.

The carriage plate 41 supports a photographic recording mechanism by means of three vertically disposed mounting plates 53, 54 and 55. The mounting plates 53 and 54 are provided with large openings which clear the cylindrical housing 8. The openings receive ball bearings 56 which also clear the cylindrical housing 8. The inner races of the ball bearings 56 support a transparent cylindrical drum or sleeve 57 through which the beam of light issuing from the cylindrical lens 30 passes.

Suitably mounted between the plates 53 and 54 in spaced relation to each other is a film supply reel 58 and a film receiver reel 59. Interposed between the film supply reel 58 and one side of the transparent sleeve 57 is a film guide structure 60 so arranged that a photographic film is guided from the film supply reel 58 to the cylindrical sleeve 57. The photographic film passes around the sleeve 57 and into a second or continuing film guide structure 61 which eventually leads to the film receiver reel 59.

A pair of clamping jaws 62 are adapted to engage the photographic film at its region of approach to the transparent sleeve 57 and its region of departure therefrom. The film clamping jaws are pivotedly connected to levers 63 by means of journal pins 64. The levers are mounted on parallel fulcrum shafts extending between the mounting plates 53 and 54. The levers are provided with offset portions extending between the shafts 65 and terminating in segmental gears 66 which intermesh so that the levers may pivot in unison and in opposite directions so as to move the clamping jaws 62 to and from each other.

The confronting ends of the clamping jaws tend to pivot toward the transparent sleeve 57 under urge of leaf springs 67. The clamping jaws are provided with oppositely directed prongs 68 which form cams engageable with deflectors pin 69 extending between the mounting plates 53 and 54 or projecting from one of these plates. Operation of the film clamping jaws will be described in more detail hereinafter.

Incorporated in the film guide structure 60 and 61 are three drive rollers or sprockets 70, 71 and 72. The drive rollers or sprockets are mounted on shafts 73, 74 and 75. The drive rollers or sprockets 70 and 71 are located symmetrically with respect to the film clamping jaws 62 so as to advance the film to the transparent cylindrical sleeve 57 and to withdraw the film therefrom. The third roller or sprocket 72 is positioned to aid in feeding the film into the film receiver reel 59.

The shafts 73, 74 and 75 extend through the mounting plate 54 and into the third mounting plate 55. In the region between the mounting plates 54 and 55 the shafts are provided with drive pulleys 76, 77 and 78 connected by a common belt 79.

A motor 80 is supported on the mounting plate 55 and is provided with a shaft 81 extending within the triangle defined by the shafts 73, 74 and 75. The motor shaft is provided with a relatively large gear 82 which meshes with an idler gear 83. The idler gear engages a driven gear 84 mounted on the shaft 74. The gear ratios are such that one rotation of the motor shaft gear will advance the film a distance at least equal to the circumference of the transparent cylindrical sleeve 57.

Also mounted on the shaft 74 is a pulley 85 which is connected by a belt 86 to a second pulley 87 mounted on the shaft 88 of the film receiver reel 59. The pulleys 85 and 87 and the belt 86 provide a take up drive which maintains tension on the film as it is wound onto the film receiver reel 59. The rate of rotation of the shaft 88 is somewhat faster than the rate of feed of the film and the belt drive is sufficiently loose to permit slippage.

Mounted on the motor shaft 81 is a clamp jaw cam 89 which engages a roller 90 mounted on a lever 91 fixed to one of the fulcrum shafts 64. A spring 92 maintains the roller 90 in contact with the cam 89. Movement of the lever 91 causes the film clamping jaws 62 to move toward and away from each other.

Also mounted on the motor shaft 81 are two timing cams 93 and 94 which operate switch units 95 and 96.

Operation of the long term photographic recorder is as follows:

By reason of the optical system comprising the light source 19; mirror 23, mirrors 24, 25, 26 and 27; the galvanometer mirror 29 and the cylindrical lens 30, direct a point of light onto the section of photographic film wrapped about the transparent cylindrical sleeve 57. Movement of the galvanometer mirror produces a corresponding deflection in the point of light impinging on the photographic film. Initially, the camera structure occupies a position to the left of the position shown in FIGURE 1.

As the tubular shaft 7 slowly rotates in response to the motor 31, the resulting radial beam of light passing through the cylindrical lens 30 describes a circle. Simultaneously the screw shaft 34 rotates and causes the carriage plate 41 and the camera thereon to move slowly toward the right as viewed in FIGURE 1. This slow movement causes the image of the light beam to describe a helical path. During this slow movement of the carriage plate 41 and camera mechanism, the worm gear 45 remains fixed and functions as a "half-nut" in its engagement with the screw shaft 34.

When the carriage plate 41 and camera mechanism have moved slowly to the right its full allotted distance of travel, the limit switch 52 is closed momentarily. Operation of the limit switch 52 initiates operation of the motor 80 causing the switch unit 96 to close so that the motor shaft gear 82 may move through one complete revolution. Before the end of the full revolution of motor shaft 81, switch 95 is closed momentarily and operating through a conventional holding relay, not shown, causes the motor 47 to rotate so as to turn the worm gear 45 thereby effecting a fast return movement to the left as viewed in FIGURE 1 until the switch 51 is opened, releasing the holding relay.

When the motor 80 is in its idle position corresponding to that shown in FIGURES 4 and 5, the film clamping jaws 62 clamp a section of film tightly about the transparent cylindrical drum 57. Immediately after operation of the motor 80 is initiated, the roller 90 drops from the trailing margin of the clamp jaw cam 89 causing the spring 92 to move the clamping jaws 62 from the position shown in FIGURES 5 and 9 to the position shown in FIGURE 10. During this initial movement, the film is not advanced due to the existence of a blank portion 82a in the gear 82.

As the clamping levers 63 move toward the position shown in FIGURE 10, the cam prongs 68 engage the pins 69 to draw the tips of the clamping jaws away from the surface of the drum 57 so that the film wrapped about the drum is in a loose condition and the film is free to move from the supply reel 58 to the receiver reel 59.

As the main gear 82 completes its cycle, the clamping jaws 62 are caused to move toward each other and in doing so ride against the film, drawing the film tightly about the transparent drum 57, as shown in FIGURES 5 and 9.

It will be noted that the transparent drum 57 is freely rotatable. This free rotation aids in the passing of the photographic film around the drum. Alternatively, as shown in FIGURE 6, the drum or sleeve 57 may be fixed in the mounting plates 53 and 54. In this case, the drum is provided adjacent each mounting plate with an annular groove 97 which receives a split ring 98 having a tendency to spread and project slightly from the groove 97. In this case, during transport of the film, the margins of the film ride on the split rings 98 to minimize friction and also to protect the radially inner side or emulsion coated side of the film from damage.

In order to insure that a new section of film is positioned about the drum 57, the cam 93 and the switch 95 may be electrically interposed between the limit switch 52 and the motor 47 so that the motor 47 is not energized until the film transporting operation has been completed.

The rate of rotation of the recording beam, as well as the pitch of its helical path and the axial extent of the transparent drum, all serve to determine the length of the recording time between changes of the film section wrapped about the transparent drum. For many recording purposes, the expected major deflections of the galvanometer may be such as to overwrite other trace convolutions without obscuring the record. Thus, one section of the film may record the events of a 24 hour day or a week or even a longer period. Still further, the film reels or magazines may be relatively large and thus accommodate many sections or units of the photographic film. The recording camera may then operate for at least several weeks and its operation extended to several months or, if need be, several years.

It is desirable, however, that means be provided to remove the exposed film with a minimum of time and effort and without disturbing the unexposed film. This may be accomplished by the arrangement shown in FIGURES 7, 8 and 11. The structure here illustrated is not so much a modification of the camera but an addition thereto.

The film guide structure 61 is provided with a straight reach 99 immediately preceding the roller or sprocket 72, that is, the final sprocket of the film-feeding mechanism. Interposed in this reach, as shown in FIGURE 11, is an anvil 100 disposed at one side of the film and a knife 101 disposed at the other side thereof. The knife is operated directly or indirectly through mechanical linkage by an armature 102 and a solenoid 103. Operation of the knife severs the film.

Incorporated in the drive pulley 78 is a spring motor 104 capable of rotating the pulley a sufficient number of turns to advance the film an amount adequate to attach the film to the spindle of the receiving magazine 59. One extremity of the spring motor is attached to a latch disk 105 having a notch 106.

Mounted at one side of the pulley 78 is a pivot shaft 107 which journals a lever 108 having three arms 109, 110 and 111. The arm 109 is provided with a catch shoulder 112 engageable with the notch 106. The arm 109 terminates in a handle 113. The arm 110 terminates in a cam follower 114 which is engageable with a cam 115 mounted on the motor shaft 81. The third arm 111 extends downwardly and terminates in a stop 116.

Supported below the stop 116 is a bracket 117 which carries a pivot 118 on which is journaled a release lever 119. The release lever includes an arm 120 terminating in a stop lug 121 positioned for cooperation with the stop 116. The lever 119 includes a second arm or trip arm 122 which extends into the vicinity of the bed structure 1. A spring 119a urges the lever 119 in a counterclockwise direction as viewed in FIGURE 8.

Below and essentially parallel with the arm 109 of the lever 108 is a pair of slide bearings 123 which guide a push rod 124. The push rod extends toward the stop lug 121 and is provided with the tip 125 engageable with the stop lug 121. The opposite end of the push rod is provided with a manually engageable knob 126. The push rod carries a switch actuator cam 127 which momentarily closes a switch 128 when the rod is pushed inwardly toward the stop lug 121.

Exposed film is removed as follows:

The push rod 124 is manually moved inward to close the switch 128 momentarily. The switch 128 is electrically connected to the motor 80 so as to initiate rotation thereof and cause the film to advance one section, and the carriage plate 41 and camera mechanism is moved to its starting position. As the carriage plate approaches its starting position, the trip arm 122 of the release lever 119 engages a stop, not shown, suitably located on the bed 1 causing the release lever to move from the solid line position to the dotted line position shown in FIGURE 8. This movement of the release lever returns the push rod 124 to its original position and in doing so causes the cam 127 to close the switch 128 momentarily a second time. This causes the camera mechanism to advance the film a second time so that all of the recorded film is safely received in the film receiver reel 59.

During the second film advance or film change, the release lever 119 is held in its dotted line position so that the biasing spring which urges the lever 108 in a counterclockwise direction causes the catch shoulder 112 to engage the notch 106 when the cam follower 114 coincides with the reduced area of the cam 115. The pulley 78 continues to rotate but the sprocket 72 is restrained so that a portion of the film may crowd into a chamber 129 provided in the film guide structure 61. By depressing the handle 113, the roller or sprocket 72 may be released. However, before operation the handle 113, a manual switch not shown, is operated to sever the film. The severed film is driven forward by the action of the spring 104 when the pulley 78 is released. The end of the film is engaged by the sprocket 72 and fed into a newly installed empty magazine 59.

It should be understood that the film guide structures per se are essentially conventional in that they are similar to automatic film loading and guiding mechanisms employed in motion picture projectors and the like. Such mechanisms guide the free end of the film through the desired path as the film is pushed or drawn into the film guide mechanism.

In order to provide time indications on the recording film, one of the mirrors, for example, mirror 24, may be caused to deflect slightly at appropriate intervals. This may be accomplished by a conventional clock mechanism, not shown, which operates a solenoid contained in a housing 28 which supports the mirror 24.

While particular embodiments of this invention have been shown and described, it is not intended to limit the same to the details of the constructions set forth, but instead, the invention embraces such changes, modifications and equivalents of the various parts and their relationships as come within the purview of the appended claims.

We claim:

1. A long term photographic recorder, comprising:
   (a) an indicating means including a reflecting element;
   (b) means for rotating said reflecting element;
   (c) a light source and reflecting means for directing a light beam toward said reflecting element for reflection therefrom in a direction radially of said rotating means;
   (d) a transparent cylinder surrounding said indicating means;
   (e) means for advancing said cylinder axially to cause said beam of light to describe a helical path thereon;
   (f) a camera including a film supply reel, a film receiving reel, means for guiding a light sensitive film from said film supply reel, around said transparent cylinder to said receiving reel;
   (g) a pair of clamping jaws movable to and from each other in a common arcuate path tangent to said cylinder and engageable with said film to draw said film tightly about said cylinder;
   (h) and means operable periodically to release said clamping jaws and advance a convolution of said film about said cylinder.

2. A long term photographic recorder, comprising:
(a) a bed structure;
(b) a rotatable structure journalled on said bed structure;
(c) indicating means carried by said rotatable structure for rotation therewith, and including a reflecting element mounted in said housing at its axis of rotation;
(d) means for directing a beam of light on said reflecting means for reflection therefrom in a radial direction;
(e) a carriage structure carried by said bed structure for movement axially with respect to said rotatable structure;
(f) a transparent cylinder carried by said carriage structure;
(g) drive means interconnecting said rotatable structure and carriage to cause said radially directed beam to describe a helical path on said transparent cylinder;
(h) a camera including a film supply reel, a film receiving reel, means for guiding a light sensitive film from said film supply reel, around said transparent cylinder to said receiving reel;
(i) a pair of clamping jaws movable to and from each other in a common arcuate path tangent to said cylinder and engageable with said film to draw said film tightly about said cylinder;
(j) and means operable periodically to release said clamping jaws and advance a convolution of said film about said cylinder.

3. A long term photographic recorder, comprising:
(a) a galvanometer including a mirror for reflecting a beam of light in response to signals received by said galvanometer;
(b) a transparent cylinder adapted to receive a convolution of a light sensitive film and positioned to intersect a beam of light reflected from said mirror;
(c) means for causing relative rotation and relative axial movement of said cylinder and mirror, thereby to cause said reflected beam of light to describe a helical path on said film;
(d) a pair of clamping jaws movable to and from each other in a common arcuate path tangent to said cylinder and engageable with said film to draw said film tightly about said cylinder;
(e) means for supplying film for said cylinder;
(f) means for collecting film from said cylinder;
(g) and means for operating said clamping jaws to release said film whereby succeeding convolutions may be fed around said cylinder.

4. A long term photographic recorder, comprising:
(a) a galvanometer including a mirror for reflecting a beam of light in response to signals received by said galvanometer;
(b) a transparent cylinder adapted to receive a convolution of a light sensitive film and positioned to intersect a beam of light reflected from said mirror;
(c) means for causing relative rotation and relative axial movement of said cylinder and mirror, thereby to cause said reflected beam of light to describe a helical path on said film;
(d) a pair of clamping jaws movable to and from each other in a common arcuate path tangent to said cylinder and engageable with said film to draw said film tightly about said cylinder;
(e) and a film transport including a film supply reel, a film receiving reel, and means for guiding light sensitive film from said supply reel, around said cylinder and to said receiving reel.

5. A long term photographic recorder as set forth in claim 4 wherein:
(a) a film severing means is incorporated in said film guide means between said cylinder and said receiving reel;
(b) and said supply reel is operable thereafter to supply a predelivered length of film for winding on a succeeding receiving reel.

6. A long term photographic recorder, comprising:
(a) a bed structure including a pair of spaced pedestals having aligned bearings;
(b) a carriage mounted on said bed structure for reciprocal movement between said pedestals;
(c) a carriage reciprocating means including a slow speed drive for moving said carriage slowly in one direction, and a high speed drive for moving said carriage rapidly in the opposite direction;
(d) a sight tube and coaxial galvanometer housing journaled between said bearings;
(e) a galvanometer mounted in said housing and rotatable therewith;
(f) optical means including a light source disposed in said sight tube and mirrors in said galvanometer housing for directing radially a beam of light modulated by said galvanometer;
(g) a transparent cylinder mounted on said carriage and surrounding and clearing said housing;
(h) a photographic film wrapped about said cylinder;
(i) a film transport mounted on said carriage for feeding film about said cylinder;
(j) and means for operating said film transport upon completion of each slow speed movement of said carriage.

7. A long term photographic recorder, as defined in claim 6, wherein:
(a) said film transport includes a pair of clamping jaws engageable with said film and movable toward each other into tangent relation to said cylinder whereby essentially the entire circumference thereof is covered by said film and held in intimate contact therewith by said clamping jaws whereby an essentially complete helical trace is made on said film by said beam of light; said clamping jaws being movable to free said film from said cylinder for advancing said film.

8. A long term photographic recorder, as defined in claim 6, wherein:
(a) said film transport includes a pair of clamping jaws engageable with said film and movable toward each other into tangent relation to said cylinder whereby essentially the entire circumference thereof is covered by said film and held in intimate contact therewith by said clamping jaws whereby an essentially complete helical trace is made on said film by said beam of light; said clamping jaws being movable to free said film from said cylinder for advancing said film;
(b) said cylinder is freely rotatable when said film is loosened and turns therewith on advance of said film.

9. A long term photographic recorder comprising:
(a) a rotatable structure including a coaxial sight tube and galvanometer housing;
(b) a galvanometer secured in said housing for rotation therewith and including a signaling mirror in axial alignment with said sight tube;
(c) a light source in said sight tube;
(d) a double faced mirror interposed between said light source and signaling mirror and defining therewith a 45° angle;
(e) other mirrors for reflecting light from one side of said double faced mirror to the other side thereof for axial reflection to and from said signaling mirror then radial reflection from said housing;
(f) a transparent cylinder surrounding said housing;
(g) and photographic film on said cylinder to receive light reflected radially from the second face of said double faced mirror.

10. A long term photographic recorder comprising:
(a) a rotatable structure including a coaxial sight tube and galvanometer housing;
(b) a galvanometer secured in said housing for rotation therewith and including a signaling mirror in axial alignment with said sight tube;
(c) a light source in said sight tube;
(d) a double faced mirror interposed between said light source and signaling mirror and defining therewith a 45° angle;
(e) other mirrors for reflecting light from one side of said double faced mirror to the other side thereof for axial reflection to and from said signaling mirror then radial reflection from said housing;
(f) a carriage mounted at one side of said rotatable structure;
(g) means for reciprocating said carriage including a slow speed drive for moving the carriage in one direction and a fast speed drive for moving the carriage in the opposite direction;
(h) a transparent cylinder mounted on said carriage and surrounding and clearing said housing;
(i) a film transport mounted on said carriage including means for periodically feeding a photographic film around said cylinder and means for clamping said film about said cylinder throughout its circumference;
(j) and means for operating said film transport between operations of said slow speed drive.

References Cited by the Examiner

UNITED STATES PATENTS

| | | | |
|---|---|---|---|
| 1,746,407 | 2/1930 | Schroter et al. | 346—108 X |
| 1,867,176 | 7/1932 | Rieckmann | 346—109 |
| 2,037,698 | 4/1936 | Carbonara | 346—108 |
| 2,511,892 | 6/1950 | Wise | 346—24 |
| 3,130,931 | 4/1964 | Hautly. | |

RICHARD B. WILKINSON, *Primary Examiner.*

J. W. HARTARY, *Assistant Examiner.*